US008477733B1

(12) United States Patent
Pawar et al.

(10) Patent No.: US 8,477,733 B1
(45) Date of Patent: Jul. 2, 2013

(54) METHOD AND SYSTEM FOR PROVIDING MULTIPLE REVERSE ACTIVITY BITS

(75) Inventors: Hemanth Balaji Pawar, Herndon, VA (US); Shilpa Kowdley Srinivas, Herndon, VA (US); Bhagwan Khanka, Lenexa, KS (US); Anoop Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 839 days.

(21) Appl. No.: 12/356,590

(22) Filed: Jan. 21, 2009

(51) Int. Cl.
*H04W 4/00* (2009.01)

(52) U.S. Cl.
USPC ............................................................. 370/332

(58) Field of Classification Search
USPC ................. 370/252, 328, 335, 342; 455/522, 455/63.1, 67.13
See application file for complete search history.

(56) References Cited

U.S. PATENT DOCUMENTS

| | | | |
|---|---|---|---|
| 6,970,437 B2 | 11/2005 | Lott et al. | |
| 7,058,124 B2 | 6/2006 | Koo | |
| 7,069,037 B2 | 6/2006 | Lott et al. | |
| 7,647,065 B2 * | 1/2010 | Au et al. | 455/522 |
| 7,831,257 B2 | 11/2010 | Pollman et al. | |
| 7,936,698 B1 * | 5/2011 | Sarkar et al. | 370/252 |
| 7,991,422 B2 * | 8/2011 | Oroskar et al. | 455/522 |
| 2003/0218997 A1 * | 11/2003 | Lohtia et al. | 370/335 |
| 2004/0121808 A1 | 6/2004 | Hen et al. | |
| 2004/0179494 A1 | 9/2004 | Attar et al. | |
| 2004/0179525 A1 | 9/2004 | Balasubramanian et al. | |
| 2004/0214591 A1 | 10/2004 | Lott et al. | |
| 2005/0047365 A1 | 3/2005 | Hong et al. | |
| 2006/0203724 A1 | 9/2006 | Ghosh et al. | |
| 2006/0223444 A1 * | 10/2006 | Gross et al. | 455/67.13 |
| 2006/0291383 A1 | 12/2006 | Bi et al. | |
| 2007/0168482 A1 | 7/2007 | Chen et al. | |
| 2007/0192090 A1 | 8/2007 | Shahidi | |
| 2007/0286128 A1 | 12/2007 | Bae et al. | |
| 2008/0004031 A1 | 1/2008 | Rong et al. | |
| 2008/0049706 A1 | 2/2008 | Khandekar et al. | |
| 2008/0062925 A1 * | 3/2008 | Mate et al. | 370/331 |
| 2008/0137614 A1 | 6/2008 | Kwon et al. | |
| 2008/0212460 A1 * | 9/2008 | Sampath | 370/203 |
| 2009/0054072 A1 | 2/2009 | Chen et al. | |
| 2009/0103507 A1 | 4/2009 | Gu et al. | |
| 2009/0170547 A1 | 7/2009 | Raghothaman et al. | |

(Continued)

OTHER PUBLICATIONS

Unpublished U.S. Appl. No. 12/620,344, entitled "Improving Reverse-Link Performance by Using Differentiated Reverse Activity Bits (RABs) Based on Mobile-Station Revision" filed Nov. 17, 2009 in the name of Jasinder P. Singh.

(Continued)

*Primary Examiner* — Hassan Kizou
*Assistant Examiner* — Roberta A Shand (57) ABSTRACT

Disclosed herein is a method and system for providing multiple reverse-activity bits (RABs) in a coverage area. An exemplary method involves (a) providing EV-DO service in a wireless coverage area; (b) measuring reverse noise rise (RNR) in the wireless coverage area; (c) comparing the measured RNR to each of a plurality of RNR thresholds, wherein each RNR threshold corresponds to one of a plurality of RABs; (d) using the RNR threshold corresponding to each RAB as compared to the measured RNR as a basis for determining whether to set or clear the particular RAB; and (e) providing the plurality of RABs in the wireless coverage area.

19 Claims, 4 Drawing Sheets

U.S. PATENT DOCUMENTS

| | | | |
|---|---|---|---|
| 2010/0002673 A1* | 1/2010 | Bae et al. | 370/342 |
| 2010/0014487 A1* | 1/2010 | Attar et al. | 370/335 |
| 2010/0103877 A1* | 4/2010 | Wang et al. | 370/328 |
| 2010/0135213 A1* | 6/2010 | Au et al. | 370/328 |
| 2010/0167777 A1 | 7/2010 | Raghothaman et al. | |
| 2010/0279653 A1* | 11/2010 | Poltorak | 455/410 |

OTHER PUBLICATIONS

Unpublished U.S. Appl. No. 12/578,347, entitled "Methods and Systems for EV-DO Femtocells to Use Proximity to Prioritize Service to Access Terminals" filed Oct. 13, 2009 in the name of Shilpa Kowdley Srinivas.

Unpublished U.S. Appl. No. 12/620,364, entitled "Using Mobile-Station Revision Ratio to Improve Reverse-Link Performance" filed Nov. 17, 2009 in the name of Jasinder P. Singh.

Unpublished U.S. Appl. No. 12/404,846, entitled "Method and System for Quality-of-Service-Differentiated Reverse Activity Bit" filed Mar. 16, 2009 in the name of Hemanth Balaji Pawar.

Non-Final Office Action mailed Aug. 17, 2011 for U.S. Appl. No. 12/404,846.

Notice of Allowance mailed Feb. 14, 2012 for U.S. Appl. No. 12/620,344.

Notice of Allowance mailed Jan. 14, 2012 for U.S. Appl. No. 12/578,347.

* cited by examiner

METHOD AND SYSTEM FOR PROVIDING MULTIPLE REVERSE ACTIVITY BITS

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95, IS-2000, or IS-856. Wireless networks that operate according to these specifications are often referred to as access networks. These access networks typically provide communication services such as voice, Short Message Service (SMS) messaging, and packet-data connectivity.

A mobile station operating in an access network is typically referred to as a wireless access terminal, while the network entity with which the wireless access terminal communicates over the air interface is known as a wireless access node. The wireless access node typically includes a device known as a radio network controller (RNC) or base station controller (BSC). The wireless access node may also include one or more base stations (also known as base transceiver stations (BTSs)), each of which includes one or more antennas that radiate to define respective wireless coverage areas within the larger coverage area served by the access network. Among other functions, the RNC controls one or more base stations, and acts as a conduit between the base stations and an entity known as a packet data serving node (PDSN), which provides access to a packet-data network. Thus, when positioned in one of these wireless coverage areas, a wireless access terminal may communicate over the packet-data network via the wireless access node and the PDSN.

Many service providers currently use wireless networks that provide service under a protocol known as EV-DO, which stands for "Evolution Data Optimized." EV-DO networks, operating in conformance with industry specification EV-DO, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network).

When congestion occurs on the reverse-link, an access node may employ a reverse-activity bit (RAB) to control or adjust the load on the reverse-link. More specifically, in each timeslot, an EV-DO access node typically transmits an RAB to all the access terminals operating in the sector it serves. The RAB indicates either that the access terminal may continue its communications on the reverse-link with no change, or that the access terminal should adjust its reverse-link activity.

OVERVIEW

For various reasons, a service provider may desire to selectively regulate reverse-link traffic, providing different instructions to increase or decrease reverse-link usage for different users. An exemplary embodiment provides for such differentiation between users by providing multiple RABs in a given sector of an access network. Furthermore, wireless service may be categorized into a number of QoS tiers, and a different RAB or set of RABs may be assigned to each QoS tier. Thus, an access network may provide QoS-differentiated services for different users by setting or clearing the RAB or RABs corresponding to different QoS tiers. However, it should be understood that QoS-differentiated service is an exemplary implementation of a multi-RAB method and system, and should not be read to limit the scope of the invention, which is set forth by the claims.

In one aspect, an exemplary method involves (a) providing EV-DO service in a wireless coverage area; (b) measuring reverse noise rise (RNR) in the wireless coverage area; (c) comparing the measured RNR to each of a plurality of RNR thresholds, wherein each RNR threshold corresponds to one of a plurality of reverse-activity bits (RABs); (d) using the RNR threshold corresponding to each RAB as compared to the measured RNR as a basis for determining whether to set or clear the particular RAB; and (e) providing the plurality of RABs in the wireless coverage area. In an exemplary embodiment, an access node may provide the RABs in its coverage area by transmitting each of the RABs over a different medium access control (MAC) sub-channel, wherein each MAC sub-channel is identified by a MAC Index.

In another aspect, an exemplary access node comprises (i) a communication interface; (ii) a processor; and (iii) data storage comprising instructions executable by the processor. The instructions may be executable to (a) provide EV-DO service in a wireless coverage area; (b) measure reverse noise rise (RNR) in the wireless coverage area; (c) compare the measured RNR to each of a plurality of RNR thresholds, wherein each RNR threshold corresponds to one of a plurality of reverse-activity bits (RABs); (d) use the RNR threshold that corresponds to each RAB as compared to the measured RNR as a basis to determine whether to set or clear the particular RAB; and (e) provide the plurality of RABs in the wireless coverage area.

In another aspect, an exemplary access terminal comprises (i) a communication interface; (ii) a processor; and (iii) data storage comprising instructions executable by the processor. The instructions may be executable to (a) engage in EV-DO communications via an access network, wherein the access network is configured to provide wireless service at a plurality of service tiers and to provide a plurality of reverse-activity bits (RABs), wherein a different one of the RABs corresponds to each service tier; (b) receive authorization for wireless service at a particular one of the service tiers; and (c) use the RAB that corresponds to the authorized service tier to adjust reverse-link activity. Further, the access terminal may also be configured to use the RAB corresponding to a service tier having a lower priority than the authorized service tier.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
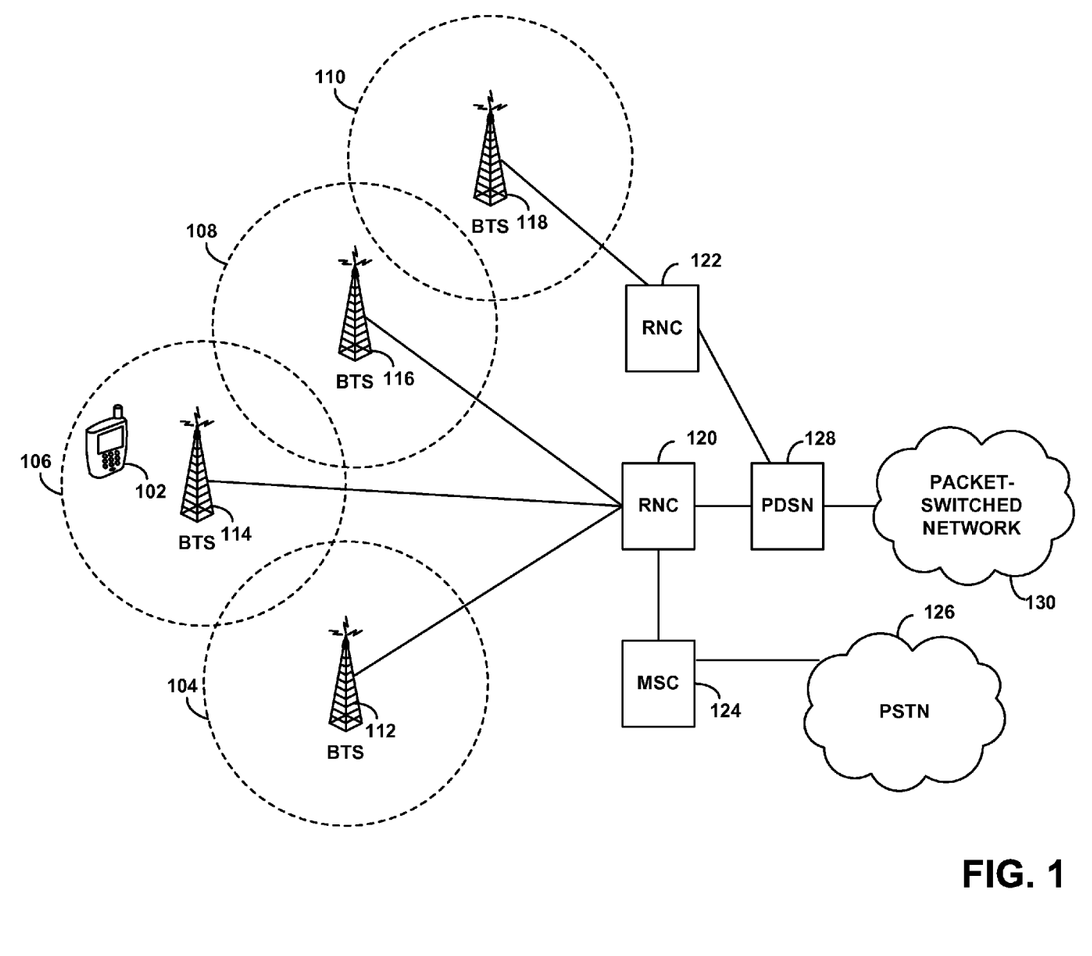
FIG. 1 is a block diagram of an access network configured to provide wireless service to wireless access terminals, according to an exemplary embodiment.

FIG. 1 is a block diagram of an access network configured to provide wireless service to wireless access terminals. As shown, an access network may include a plurality of base stations 112-118. Each base station 112-118 of the access network may function to transmit RF-radiation patterns at one or more carrier frequencies. The RF-radiation patterns may then provide one or more air interfaces over which the access terminal 102 may communicate with the access network. For example, each base station 112-118 may transmit omni-directional RF-radiation patterns that provide a single air interface. Alternatively, each base station 112-118 may transmit directional RF-radiation patterns that provide multiple air interfaces.

Each of the air interfaces may define a corresponding wireless coverage area 104-110 of its corresponding base station 112-118, respectively. If a base station, such as base station 112, provides a single air interface, then the base station may serve a single wireless coverage area 104 (e.g., a cell). Alternatively, if a base station provides multiple air interfaces, the base station may serve multiple wireless coverage areas (e.g., sectors). In either case, each of the one or more air interfaces and their corresponding wireless coverage areas may be defined by the one or more carrier frequencies of their respective serving base station 112-118 and/or a pseudo-random number (PN) offset that distinguishes one wireless coverage area of the a given base station from another.

Each base station tower is typically connected with a radio network controller (RNC) (also known as a base station controller (BSC)). In the access network, base stations 112-116 are connected to RNC 120, and base station 110 is connected to RNC 122. Each RNC may function to communicate with and control aspects of the base stations it serves, as well as aspects of air-interface communications with the access terminal 102. Each RNC, such as RNC 120 or RNC 122, may then be coupled to a switch or gateway, such as a mobile switching center (MSC) 124, which may provide connectivity with public-switched telephone network (PSTN) 126. Further, RNC 120 may also be coupled to a switch or gateway, such as a packet-data serving node (PDSN) 128, which may provide connectivity with a packet-switched network 130, such as the Internet. In this respect, RNC 120 may additionally include a packet control function ("PCF") for controlling packet-data communications. Accordingly, with this general arrangement, the access network may facilitate communications between access terminals operating in the access network's coverage areas and PSTN 128 and/or the packet-switched network 126.

The network may communicate with access terminal 102 according to any of a variety of air-interface protocols. For example, the air interfaces 130-136 may carry communications according to CDMA (e.g., 1xRTT, EV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces may also be divided into a plurality of channels for carrying different types of communications between the access terminal 102 and the access network. For example, each air interface may include forward-link channels (e.g., control channels, forward-traffic channels, etc.) for carrying forward-link communications from the access network to the access terminal 102, as well as reverse-link channels (e.g., access channels, reverse-traffic channels, etc.) for carrying reverse-link communications from the access terminal 102 to the access network.

To provide the arrangement of FIG. 1 in practice, each access terminal is commonly equipped with a "mobile station modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by the access network include EV-DO. By way of example, each cell site modem can be a Qualcomm CSM6800™ chipset, and each mobile station modem can be an MSM6800™ chipset, or the latest chipsets improving thereupon. Both the CSM6800™ chipset and MSM6800™ chipset have EV-DO operating modes (e.g., 1xEV-DO Rev. 0 or Rev. A), and each chipset can be programmatically set to operate in that mode. It should be understood that other chipsets, including upgrades to the chipsets named herein, as well as others providing similar functionality, may also be utilized without departing from the scope of the invention.

Under EV-DO, the forward link uses time-division multiplexing (TDM) in order to allocate all of the sector's forward-link power to a given access terminal at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, a Medium Access Control (MAC) channel, a control channel, and, if any traffic exists, a forward traffic channel.

The pilot channel may be used for signal acquisition, synchronization, demodulation, and decoding, as well as Signal-to-Noise Ratio (SNR) estimation. In particular, a base station transmits a pilot signal over the pilot channel, which is encoded with a particular PN offset that identifies the sector. An access terminal that is within range can detect the pilot signal, and use the relative strength of the pilot signal to maintain an "active set" of sectors, which identifies sectors that are candidates for a handoff. Generally, if the strength of a given pilot signal is above a predetermined threshold, the access terminal adds the sector to its active set. Likewise, if the pilot-signal strength for a given sector falls below the threshold, the sector is removed from the active set.

The MAC channel is typically used to provide information for those access terminals that are active in a sector (i.e., that have established connectivity to the base station serving the sector). In particular, the MAC channel provides data rate control (DRC) mechanisms to control the data rate that an access terminal should use on the forward link. (The forward-link data rate is generally determined based on the SNR for the access terminal.) The MAC channel includes a number of sub-channels, which are each identified by a unique MAC index. In practice, the MAC channel may include 128 sub-channels, identified by MAC indices of 0 to 127, respectively. Each MAC subchannel is spread by a Walsh code, which, in EV-DO, is either a 64-bit or 128-bit Walsh code.

On the reverse link, interference can be, and often is, present within a sector. In general, an access node receives transmissions from access terminals that are operating in the sector it serves. However, the access node often also receives interfering transmissions from other access terminals, other devices, and/or any other source using the same frequency or frequencies as a given sector. At times, when interference is high, the access network may desire that access terminals operating in a given sector, reduce their reverse-link activity. Accordingly, an access network may transmit a reverse-activity bit (RAB) that instructs access terminals to adjust their reverse-link activity. The value of the RAB is generally based upon a parameter referred to as reverse noise rise (RNR).

More specifically, at a given moment, the sum total of what an access node is receiving in a given sector is known as the "reverse noise" in that sector. At regular intervals, and in current practice quite frequently (e.g., once for every forward-link timeslot—approximately every 1.67 ms), access nodes compute the RNR, which is the difference between (i) the reverse noise that the access node is currently detecting and (ii) a baseline level of reverse noise. Thus, the access node computes how far the reverse noise has risen above that baseline.

To determine the baseline level, EV-DO networks typically utilize what is known as a silent interval, which occurs periodically (e.g., once every five minutes), and lasts on the order of 40-100 ms. Both the period and the duration of the silent interval are typically configurable. During the silent interval, access terminals refrain from transmitting anything to the access node. As a result, whatever is received during the sleep interval may be characterized as noise. As such, the baseline corresponds to the amount of reverse noise when the sector is unloaded (i.e. without any transmitting access terminals). Note that other reverse-link-noise levels could be used as a baseline, other than the unloaded-sector level.

In general, the lower the RNR is at a given moment, the more favorable the RF conditions are for communication between access terminals and the access node at that moment. Correspondingly, the higher the RNR, the less favorable the RF conditions are. Also, a low RNR generally corresponds to a sector being lightly loaded (i.e., the sector is supporting communications for a relatively low number of access terminals). A high RNR, as one might expect, generally corresponds to a sector being heavily loaded (i.e., the sector is supporting communications for a relatively high number of access terminals).

Access nodes typically use the calculated value of RNR to, among other things, set the RAB, which is a value that the access node makes equal to 0 or 1. Note that making the RAB equal to 0 (zero) is known as "clearing" the RAB, while making the RAB equal to 1 (one) is known as "setting" the RAB. Under EV-DO, Rev. A, the access node repeatedly transmits (e.g., once in every forward-link timeslot) an RAB equal to either 0 or 1. Accordingly, the access node typically repeats the calculation of RNR once in every forward-link timeslot (e.g., once every 1.67 ms).

With respect to how the access node chooses whether to set or clear the RAB, if the RNR is above a threshold (the "RNR threshold") the access node sets the RAB. If the RNR is below the RNR threshold, the access node clears the RAB. The RNR threshold may be configurable, for example, between 0 decibels (dB) and 30 dB, and is typically set to be 5 dB in EV-DO networks. According to EV-DO, Rev. A, the access node transmits the RAB on the MAC subchannel identified by MAC Index 4. Note also that according to EV-DO, Rev. A, the RAB is the same for all access terminals on a sector/carrier.

Each individual access terminal may receive the RAB for its serving sector, as well as the RAB from each sector in its active set. The RAB from the serving sector and those from its active-set sectors may then be used by the access terminal to compute what are known as a Quick Reverse Activity Bit (QRAB) and a Filtered Reverse Activity Bit (FRAB). The QRAB is binary (equal to 0 or 1), while the FRAB is a real number having a value anywhere between −1 and +1 inclusive.

The QRAB is a short-term, binary indication of loading. A QRAB of 1 is associated with congestion on the sector/carrier, while a QRAB of 0 is associated with non-congestion. According to EV-DO, Rev. A, the QRAB is calculated periodically, after every four timeslots, by determining, for each sector, the average value of the sector's RAB over the previous four time slots. The maximum of these average RAB values is then rounded to nearest whole number (i.e., 0 or 1). Take, for example, an access terminal that is served by sector_A and has an active set including sector_B. The RAB values for sector_A in four consecutive timeslots are 0, 0, 0, and 1, respectively, and the RAB values for sector_B in the same four timeslots are 1, 1, 0, and 1, respectively. Thus, the average RAB value for sector_A is 0.25, and the average for sector_B is 0.75. The maximum of these average RAB values is 0.75 and therefore the QRAB is determined to be 1 (e.g., rounded up from 0.75). It should be understood that in the event that the maximum average RAB is 0.5, it is an engineering design choice as to whether an access terminal will round up or round down.

The FRAB is a longer-term, continuous, historical value, where values closer to −1 indicate a lower degree of congestion on the reverse link, and values closer to +1 indicate a higher degree of congestion. According to EV-DO, Rev. A, the FRAB is calculated in a similar manner as QRAB (i.e., calculating the average RAB value for each sector, and determining maximum of those average RABs), except that the RAB value for each sector is averaged over 384 timeslots and the FRAB is simply the maximum average (i.e., not rounded to the nearest whole number). Since the FRAB is also calculated periodically, every four timeslots, only four of the 384 RAB values differ between consecutive FRAB calculations. As a result, the FRAB typically changes much more slowly than the QRAB.

The access terminal uses the QRAB and FRAB to calculate a value known in Rev. A as "T2PInflow." T2PInflow is an iterative value: prior to each reverse-link transmission, it has a current value, and that current value is one of the inputs into determining its value in the next calculation. Note that the "T2P" prefix means "Traffic to Pilot," as one governing principle that drives the determination of reverse-link data rates under Rev. A is the relative values of (1) the power level that the access terminal is using to transmit on the reverse-link portion of the traffic channel and (2) the power level at which the access terminal is detecting the pilot signal from the access node, as is known in the art.

Rev. A defines two functions called "T2PDn(.)" and "T2PUp(.)," both of which are functions of the current T2PInflow, FRAB, and a filtered value of the serving sector pilot strength. If the access terminal sets QRAB to 1 (corresponding to a relatively congested sector/carrier), then T2PInflow will be decremented by the result of T2PDn(.); if, on the other hand, the access terminal sets QRAB to 0 (corresponding to a relatively non-congested sector/carrier), then T2PInflow will be incremented by the result of T2PUp(.). As with all of the details of these computations, the detailed equations can be found in EV-DO, Rev. A.

Under Rev. A, this updated T2PInflow value is then used as one of the inputs in what is referred to as a "token bucket" mechanism, which is used to determine a packet size for the next reverse-link transmission. And it is this packet size that essentially determines the reverse-link data rate at which the access terminal will be transmitting, based on a table that correlates packet sizes to data rates. In general, the token bucket mechanism is used as a regulator, to provide data-rate stability over time, while still permitting some instantaneous deviation.

One of the parameters of the token bucket mechanism is the "BucketLevel." Using that value, the updated T2PInflow, and the FRAB, the access terminal calculates a value known as "PotentialT2POutflow." The access terminal also maintains a data queue for outgoing data (i.e. data that is ready and waiting to be transmitted to the access node on the reverse link). The access terminal keeps track of the current size of this data queue in a variable referred to here as the "data queue size." The access terminal determines the packet size for the next transmission based on PotentialT2POutflow, the data queue size, other constraints and maximum/minimum allowed values, and the access terminal's transmission power.

As stated, the computed packet size essentially determines the reverse-link data rate. Under EV-DO, Rev. A, effective reverse-link data rates can range from 19.2 kbps up to 1.84 megabits per second (Mbps). As a final part of the calculation, the access terminal computes a value known as "T2POutflow" (also referred to as "actual T2POutflow") based on the computed packet size. The access terminal then updates the BucketLevel with the updated T2PInflow value and the newly-calculated (actual) T2POutflow value, so that the BucketLevel will be ready for the next iteration.

Naturally, there will be times when transmission conditions are favorable with respect to the wireless service (i.e., times when favorable RF conditions prevail), and there will be times when poor RF conditions are present. As described above, current implementations of EV-DO networks deal with this, in among other ways, by setting the RAB when RF conditions are unfavorable (associated with a relatively high RNR), and by clearing the RAB when RF conditions are favorable (associated with a relatively low RNR).

When the RAB is set, access terminals typically maintain or decrease their reverse-link data-transmission rates, and consequently their reverse-link transmission power levels—actions that may help correct a high-RNR situation. When the RAB is clear, access terminals are typically configured to maintain or increase their reverse-link data rates and power levels, which may cause RNR to increase, though this is considered acceptable when RNR is initially low enough—and of course it is desirable to grant higher reverse-link data rates to access terminals when tolerable.

Figure 2:
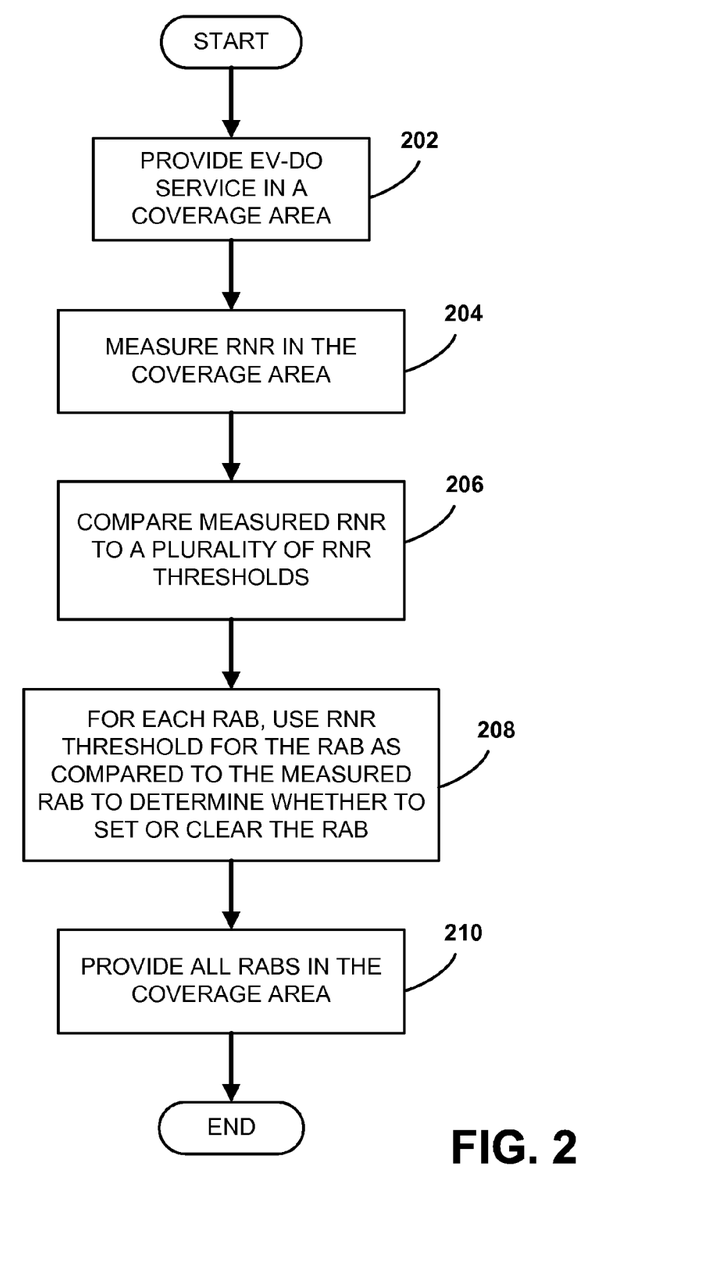
FIG. 2 is a flow chart illustrating a method for providing multiple RABs in a coverage area, according to an exemplary embodiment.

FIG. 2 is a flow chart illustrating a method for providing multiple RABs in a coverage area, according to an exemplary embodiment. The method is described by way of example, with reference to an access node carrying out the method. However, it should be understood that other entities may carry out the method or portions thereof, without departing from the scope of the invention. The method generally involves an access node providing EV-DO service in a wireless coverage area, as shown by block 202, as well as setting and transmitting multiple RABs in the coverage area, as shown by blocks 204-210.

In particular, the access node measures RNR in its coverage area, as shown by block 204. The access node then compares the measured RNR to a plurality of RNR thresholds, as shown by block 206. Each RNR threshold corresponds to a different one of the plurality of RABs that are provided by the access node. Accordingly, the access node may use the RNR threshold for each RAB, as compared to the measured RNR, to determine whether to set or clear that RAB, as shown by block 208. The access node may then set or clear each RAB accordingly, and provide the RABs in the wireless coverage area, as shown by block 210.

As explained above, to measure the RNR in its coverage area, the access node determines a current level of noise on the reverse link. The access node may then compute the RNR as the difference between that current level of noise and a baseline level of noise on the reverse link as measured during periodic coordinated silent intervals (e.g., the level of noise present in the sector when the sector is unloaded, without any transmitting mobile stations for predetermined period of time). Furthermore, the RNR value that access node measures in accordance with carrying out step 204 is typically, but not necessarily, the most-recently-measured value, or perhaps an average of multiple RNR measurements over some preceding time period, among other possibilities. The access node then uses the measured RNR to separately determine whether to set or clear each of the RABs for its coverage area.

Figure 3:
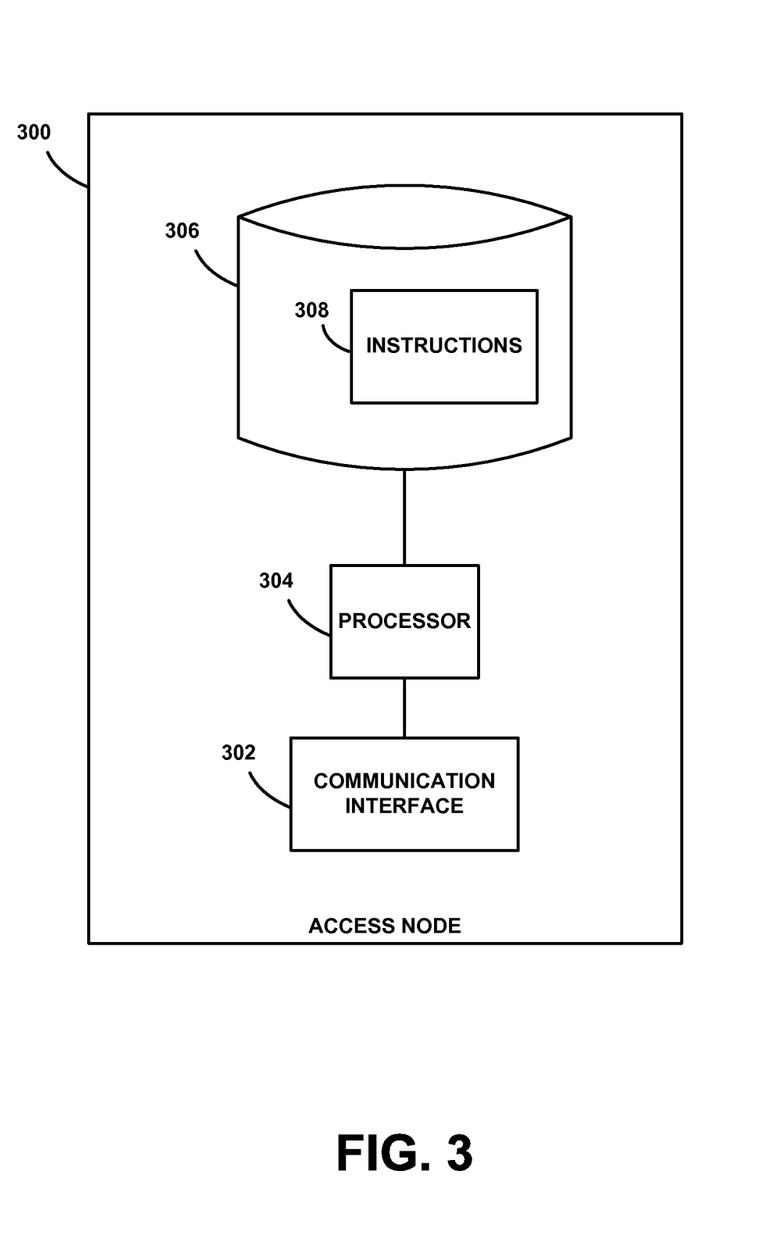
FIG. 3 is a block diagram illustrating an access node according to an exemplary embodiment.

FIG. 3 is a block diagram illustrating an access node 300 according to an exemplary embodiment. The access node 300 includes a communication interface 302, a processor 304, and data storage 306. Data storage 306 stores program code or instructions 308 that are executable by processor 304 to provide EV-DO service to access terminals operating in the coverage area served by access node 300. According to an exemplary embodiment, access node 300 is also configured to provide multiple RABs in a given coverage area (i.e., in a given sector). Accordingly, the access node 300 may define multiple RNR thresholds for the coverage area, with each RNR threshold corresponding to a different RAB. For example, the access node may define three RNR thresholds in order to provide three different RABs in its coverage area. Other configurations are also possible.

In an exemplary embodiment, the access node evaluates whether to set or clear each RAB separately, based upon the RNR threshold corresponding to the particular RAB. Specifically, for each RAB, the access node compares the RNR threshold associated with the RAB to the measured RNR. The access node then sets the RAB if the measured RNR is greater than the RNR threshold for the RAB, and clears the RAB if the measured RNR is less than (or equal to) the RNR threshold for the RAB. It should be understood that access node 300 may further be configured to periodically (e.g., every timeslot) set or clear each of its RABs, and to periodically provide the RABs in its coverage area.

As an example, an access node may provide three RABs in its coverage area: RAB_A, RAB_B, and RAB_C. The RNR threshold for RAB_A may be X dB, the RNR threshold for RAB_B may be Y dB, and the RNR threshold for RAB_C may be Z dB, where X<Y<Z. Accordingly, if the measured RNR is equal to A dB, and A<X<Y<Z, then all three RABs are cleared. If, in the alternative, X<A<Y<Z, then RAB_A is set, and RAB_B and RAB_C are cleared. If X<Y<A<Z, then RAB_A and RAB_B are set, and RAB_C is cleared. Lastly, if X<Y<Z<A, then all three RABs are set.

As a more specific example, the RNR threshold for RAB_A may be 5 dB, the RNR threshold for RAB_B may be 6 dB, the RNR threshold for RAB_C may be 7 dB, and the measured RNR may be 6.2 dB. Since the measured RNR is greater than the RNR thresholds for RAB_A and RAB_B, but less than the RNR threshold for RAB_C, both RAB_A and RAB_B are set, while RAB_C is cleared. If, in the next timeslot, the reverse-link changes such that the measured RNR is 5.7 dB, only RAB_A is set, while both RAB_B and RAB_C are cleared. Further, the access network may maintain all three RABs by measuring the RNR and setting/clearing each RAB, once in every timeslot.

Access node 300 may use multiple sub-channels to provide multiple RABs in its coverage area. In an exemplary embodiment, access node 300 uses a different MAC sub-channel, with a different MAC Index, to transmit each RAB. Continuing the previous example, the access node may transmit RAB_A in the MAC sub-channel identified by MAC Index 4, RAB_B in the MAC sub-channel identified by MAC Index 1, and RAB_C in MAC sub-channel identified by MAC Index 0. MAC Indices 0, 1, and 4 have been used to illustrate because, according to EV-DO, Rev. A, MAC Index 4 is already assigned for reverse activity, and MAC Indices 0 and 1 have no predefined assignment. Thus, integration of such an embodiment may prove easier than embodiments requiring that channel assignment be changed. However, it should be understood that the scope is not limited whatsoever by the specific channels used to transmit the RABs.

In a further aspect, a wireless service provider may implement access node 300 in a wireless access network that provides a number of different service tiers. Each service tier may specify, for example, services, applications, etc. available for the tier, available bandwidth for the various services, applications, etc., and/or a user's priority for certain network resources. In an exemplary embodiment, service tiers may be implemented to provide QoS-differentiated service to users and, accordingly, the service tiers may take the form of QoS tiers.

Use of service tiers, and in particular QoS tiers, may help a service provider meet varying needs of its customers. For example, some users may wish to pay for a higher QoS tier with increased bandwidth and/or access to premium applications. Some may desire a QoS tier with guaranteed service. Others may not mind having reduced capabilities in times of high congestion (e.g., having a lower priority), as long as higher-quality service is provided when available. In any event, the implementation of an exemplary method in an access terminal may help a service provider meet the potentially diverse needs of its customers. It should be understood, however, that other benefits may also be provided by an exemplary method.

As a specific example, a service provider may provide three QoS tiers, which, for simplicity, may be referred to as the Gold, Silver, and Bronze tiers. The Gold tier may provide the highest QoS, while the Bronze tier provides the lowest QoS and the Silver tier provides intermediary QoS. Accordingly, Gold-tier users may be authorized for more services, better access to services, a greater bandwidth, guaranteed bandwidth, etc., as compared to Silver-tier users and Bronze-tier users. Likewise, Silver-tier users may be authorized for superior services and access to resources, as compared to Bronze-tier users. However, it is possible the Bronze-tier users may receive the same service as Gold-tier users and/or Silver-tier users, in certain scenarios. For instance, when network traffic is minimal and ample resources are available, users of all QoS tiers may have equal access to available bandwidth. On the other hand, it is also possible that higher QoS tiers may always receive superior service as compared to lower QoS tiers.

Accordingly, access node 300 may be configured to provide QoS-differentiated service. In particular, when a given user connects to the access node 300, the access node 300 may determine the QoS tier to which the user or access terminal belongs (e.g., the service plan paid for by the user), and provide service as specified by the service profile specified by the user's QoS tier. Access node 300 may authorize the user for a given QoS tier using various techniques, such as by requesting and verifying a username and password, for instance. In an alternative embodiment, the access network may be configured to authorize the access terminal 400 automatically, when the access terminal connects to the access network. Generally, an access terminal and/or access network may employ any technique for authorizing a user or an access terminal for certain services, without departing from the scope of the invention.

Figure 4:
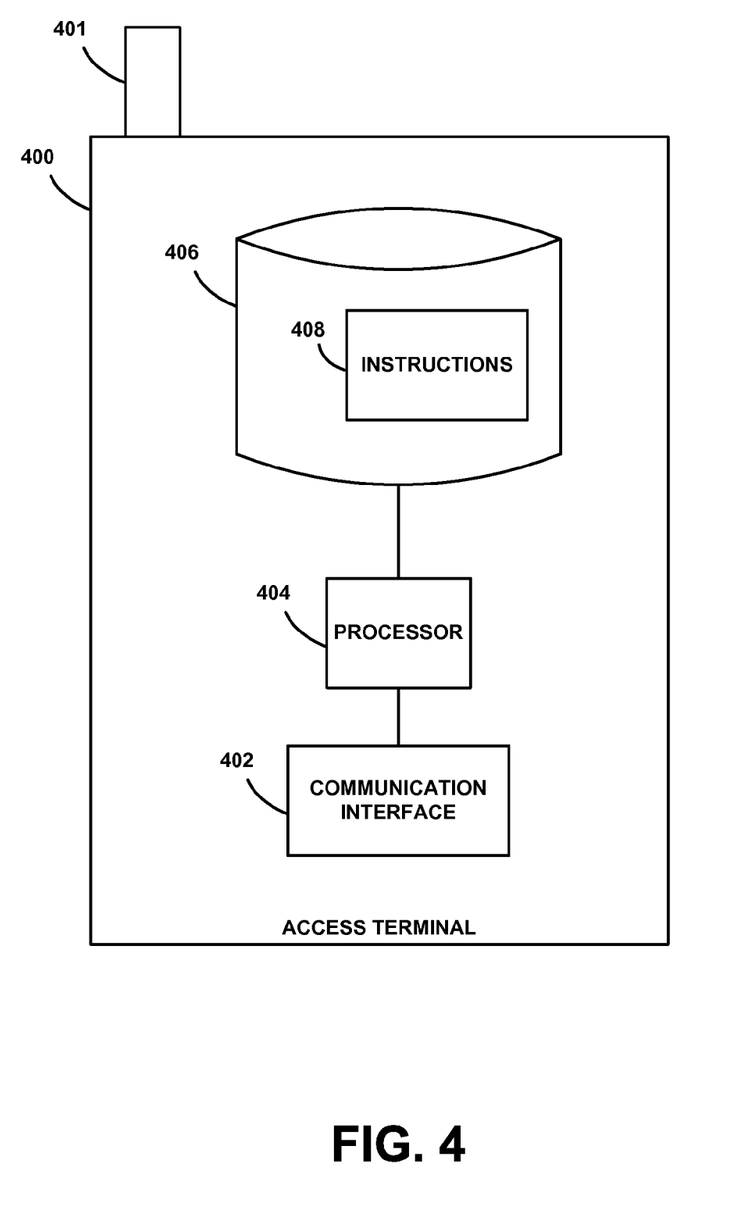
FIG. 4 is a block diagram illustrating an access terminal according to an exemplary embodiment.

FIG. 4 is a block diagram illustrating an access terminal 400 according to an exemplary embodiment. The access node 400 includes an antenna 401, a communication interface 402, a processor 404, and data storage 406. Data storage 406 stores program code or instructions 408 that are executable by processor 404 to engage in EV-DO communications with an access network, such as that illustrated in FIG. 1. Access terminal 400 is configured to request and receive authorization for service according to one of multiple available service tiers (e.g., QoS tiers). Further, access terminal 400 may, based on the service tier for which it is authorized, select one or more RABs, from the RABs available in its serving sector. The access terminal may then adjust its reverse-activity based upon the selected RABs, ignoring other RABs that are provided in its sector of access.

Access terminal 400 may connect in an access network where the service provider provides three service tiers (i.e., Gold, Silver and Bronze tiers—the Gold tier providing the highest QoS and the Bronze tier providing the lowest) to which a user may subscribe. For example, the user of access terminal 400 may have subscribed for Silver tier service. As such, the access terminal 400 is configured to prompt the user for authorization information, such as a user name and password, and send the authorization information entered by the user to the access network, in order that the user may be provided services as specified by the Silver tier.

An exemplary access terminal that is authorized for a given QoS tier typically uses the RAB corresponding to its tier to adjust its reverse-link activity. For example, once the access terminal 400 receives an indication from the access network that Silver tier service is authorized, the access terminal listens for RABs that correspond to the Silver tier. For instance, the access network may specify that RAB_A (identified by MAC Index 4) corresponds to the Bronze tier, that RAB_B (identified by MAC Index 1) corresponds to the Silver tier, and that RAB_C (identified by MAC Index 0) corresponds to the Gold tier. Since access terminal 400 is authorized for Silver tier service, it looks for RAB_B in the MAC subchannel identified by MAC Index 1, and uses RAB_B to adjust its activity on the reverse-link.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method comprising:
   (a) providing service in a wireless coverage area;
   (b) measuring reverse noise rise (RNR) in the wireless coverage area;
   (c) comparing the measured RNR to each RNR threshold in a plurality of RNR thresholds, wherein each RNR threshold in the plurality of RNR thresholds corresponds to a respective reverse-activity bit (RAB) in a plurality of RABs;
   (d) using the RNR threshold corresponding to each particular RAB in the plurality of RABs as compared to the measured RNR as a basis for determining whether to set or clear the particular RAB; and
   (e) providing the plurality of RABs in the wireless coverage area,
   wherein the plurality of RABs comprises a first RAB, a second RAB, and a third RAB, wherein the plurality of RNR thresholds comprises a first RNR threshold that corresponds to the first RAB, a second RNR threshold that corresponds to the second RAB, and a third RNR threshold that corresponds to the third RAB, and wherein using the RNR threshold corresponding to each RAB in the plurality of RABs as compared to the measured RNR as a basis for determining whether to set or clear the particular RAB comprises (i) if the measured RNR is less than both the first RNR threshold and the second RNR threshold, then clearing the first RAB, the second RAB, and the third RAB, (ii) if the measured RNR is greater than or equal to the first RNR threshold and less than the second RNR threshold and the third RNR threshold, then setting the first RAB and clearing the second RAB and the third RAB, (iii) if the measured RNR is greater than or equal to the first RNR threshold and the second RNR threshold, and less than the third RNR threshold, then setting the first RAB and the second RAB and clearing the third RAB, and (iv) if the measured RNR is greater than or equal to the first RNR threshold, the second RNR threshold, and the third RNR threshold, then setting the first RAB, the second RAB, and the third RAB.

2. The method of claim 1, further comprising:
providing a plurality of reverse-activity channels in the wireless coverage area, wherein providing the plurality of RABs in the wireless coverage area comprises transmitting each of the RABs in a different one of the reverse-activity channels.

3. The method of claim 2, wherein the plurality of reverse-activity channels comprises a plurality of medium access control (MAC) sub-channels, wherein each MAC sub-channel is identified by a MAC Index.

4. The method of claim 3, wherein the plurality of MAC sub-channels comprises three MAC sub-channels identified by MAC Indices 0, 1, and 4, respectively.

5. A method comprising:
(a) providing service in a wireless coverage area;
(b) measuring reverse noise rise (RNR) in the wireless coverage area;
(c) comparing the measured RNR to each RNR threshold in a plurality of RNR thresholds, wherein each RNR threshold in the plurality of RNR thresholds corresponds to a respective reverse-activity bit (RAB) in a plurality of RABs;
(d) using the RNR threshold corresponding to each particular RAB in the plurality of RABs as compared to the measured RNR as a basis for determining whether to set or clear the particular RAB; and
(e) providing the plurality of RABs in the wireless coverage area,
wherein the plurality of RABs comprises a first RAB and a second RAB, wherein the plurality of RNR thresholds comprises a first RNR threshold that corresponds to the first RAB and a second RNR threshold that corresponds to the second RAB, and wherein using the RNR threshold corresponding to each RAB in the plurality of RABs as compared to the measured RNR as a basis for determining whether to set or clear the particular RAB comprises (i) if the measured RNR is less than both the first RNR threshold and the second RNR threshold, then clearing both the first RAB and the second RAB, (ii) if the measured RNR is greater than or equal to the first RNR threshold and less than the second RNR threshold, then setting the first RAB and clearing the second RAB, and (iii) if the measured RNR is greater than or equal to both the first RNR threshold and the second RNR threshold, then setting both the first RAB and the second RAB.

6. The method of claim 5, wherein providing service in the wireless coverage area comprises providing service at a plurality of quality-of-service (QoS) tiers, and wherein each RNR threshold corresponds to a different one of the QoS tiers.

7. The method of claim 6, wherein at least one characteristic selected from the group consisting of available bandwidth and available functionality varies between the QoS tiers.

8. The method of claim 6, further comprising authorizing an access terminal for wireless service at one of the QoS tiers.

9. The method of claim 5, wherein the wireless coverage area comprises a sector of a wireless access network.

10. The method of claim 5, wherein providing service in the wireless coverage area comprises providing service at a plurality of quality-of-service (QoS) tiers, and wherein each of the RABs corresponds to a different one of the QoS tiers.

11. The method of claim 5, further comprising:
providing a plurality of reverse-activity channels in the wireless coverage area, wherein providing the plurality of RABs in the wireless coverage area comprises transmitting each of the RABs in a different one of the reverse-activity channels.

12. The method of claim 11, wherein the plurality of reverse-activity channels comprises a plurality of medium access control (MAC) sub-channels, wherein each MAC sub-channel is identified by a MAC Index.

13. An access node comprising:
a communication interface;
a processor; and
data storage comprising instructions executable by the processor for:
(a) providing service in a wireless coverage area;
(b) measuring reverse noise rise (RNR) in the wireless coverage area;
(c) comparing the measured RNR to each RNR threshold in a plurality of RNR thresholds, wherein each RNR threshold in the plurality of RNR thresholds corresponds to a respective reverse-activity bit (RAB) in a plurality of RABs;
(d) using the RNR threshold that corresponds to each particular RAB in the plurality of RABs as compared to the measured RNR as a basis to determine whether to set or clear the particular RAB; and
(e) providing the plurality of RABs in the wireless coverage area,
wherein the plurality of RABs comprises a first RAB and a second RAB, wherein the plurality of RNR thresholds comprises a first RNR threshold that corresponds to the first RAB and a second RNR threshold that corresponds to the second RAB, and wherein using the RNR threshold corresponding to each RAB in the plurality of RABs as compared to the measured RNR as a basis for determining whether to set or clear the particular RAB comprises (i) if the measured RNR is less than both the first RNR threshold and the second RNR threshold, then clearing both the first RAB and the second RAB, (ii) if the measured RNR is greater than or equal to the first RNR threshold and less than the second RNR threshold, then setting the first RAB and clearing the second RAB, and (iii) if the measured RNR is greater than or equal to both the first RNR threshold and the second RNR threshold, then setting both the first RAB and the second RAB.

14. The access node of claim 13, wherein the access node is configured to provide service to access terminals at a plurality of quality-of-service (QoS) tiers, and wherein each RNR threshold corresponds to a different one of the QoS tiers.

15. The access node of claim 14, wherein the instructions are further executable by the processor to authorize an access terminal for service according to one of the QoS tiers.

16. The access node of claim 14, wherein each QoS tier has a priority, and wherein a higher-priority QoS tier provides greater access to network resources as compared to a lower-priority QoS tier.

17. The access node of claim 14, wherein each QoS tier has a priority, and wherein a higher-priority QoS tier provides improved wireless service capabilities as compared to a lower-priority QoS tier.

18. The method of claim 13, further comprising:
   providing a plurality of reverse-activity channels in the wireless coverage area, wherein providing the plurality of RABs in the wireless coverage area comprises transmitting each of the RABs in a different one of the reverse-activity channels.

19. The method of claim 18, wherein the plurality of reverse-activity channels comprises a plurality of medium access control (MAC) sub-channels, wherein each MAC sub-channel is identified by a MAC Index.

* * * * *